(12) United States Patent
Ballard et al.

(10) Patent No.: US 7,940,673 B2
(45) Date of Patent: May 10, 2011

(54) SYSTEM FOR INTEGRATING A PLURALITY OF MODULES USING A POWER/DATA BACKBONE NETWORK

(75) Inventors: Claudio R. Ballard, Fort Lauderdale, FL (US); Andrew P. Sargent, Chittenden, VT (US); Jeffrey N. Seward, Fairfax, VT (US)

(73) Assignee: Veedims, LLC, Fort Lauderdale, FL (US)

( * ) Notice: Subject to any disclaimer, the term of this patent is extended or adjusted under 35 U.S.C. 154(b) by 313 days.

(21) Appl. No.: 12/134,424

(22) Filed: Jun. 6, 2008

(65) Prior Publication Data

US 2009/0016216 A1 Jan. 15, 2009

Related U.S. Application Data

(60) Provisional application No. 60/933,358, filed on Jun. 6, 2007.

(51) Int. Cl.
*G06F 11/00* (2006.01)
(52) U.S. Cl. .................................................... 370/241
(58) Field of Classification Search .................. 370/230, 370/241–253
See application file for complete search history.

(56) References Cited

U.S. PATENT DOCUMENTS

| | | | |
|---|---|---|---|
| 2,180,731 A | | 11/1939 | Dickinson |
| 3,259,684 A | | 7/1966 | Wakefield |
| 3,433,891 A | | 3/1969 | Mackenzie, Jr. |
| 5,149,915 A | | 9/1992 | Brunker et al. |
| 5,195,092 A | * | 3/1993 | Wilson et al. ................. 725/146 |
| 5,304,739 A | | 4/1994 | Klug et al. |
| 5,416,777 A | * | 5/1995 | Kirkham ....................... 370/449 |
| 5,557,698 A | | 9/1996 | Gareis et al. |
| 5,637,933 A | | 6/1997 | Rawlings et al. |
| 5,745,027 A | | 4/1998 | Malville |
| 6,011,548 A | * | 1/2000 | Thacker ........................ 725/105 |
| 6,182,807 B1 | * | 2/2001 | Saito et al. ........................ 191/2 |
| 6,198,244 B1 | | 3/2001 | Hayden et al. |
| 6,262,982 B1 | * | 7/2001 | Donahue et al. .............. 370/352 |

(Continued)

FOREIGN PATENT DOCUMENTS

| | | |
|---|---|---|
| DE | 19526809 A1 | 1/1997 |
| DE | 10311396 A1 | 9/2004 |
| DE | 102004053238 A1 | 5/2006 |

(Continued)

OTHER PUBLICATIONS

PCT: International Preliminary Report on Patentability of PCT/IB2008/002056 (related application); Dec. 7, 2009; 6 pgs.

(Continued)

*Primary Examiner* — Derrick W Ferris
*Assistant Examiner* — Mang Yeung
(74) *Attorney, Agent, or Firm* — Howison & Arnott, L.L.P.

(57) ABSTRACT

A Virtual Electrical and Electronic Device Interface and Management System (VEEDIMS) is provided. In one example, the VEEDIMS includes a backbone network formed by cables that are configured to simultaneously carry digital data and power. A controller is coupled to the backbone network and configured to execute control instructions. A plurality of modules are coupled to the controller via the backbone network and receive data and power via the backbone network. The modules receive control signals from the controller based on the control instructions. At least one device is coupled to one of the modules via a direct input/output (I/O) interface positioned in the module. A device specific driver contained in the module provides a communications interface between the device and a generic VEEDIMS controller driver in the controller.

25 Claims, 10 Drawing Sheets

U.S. PATENT DOCUMENTS

| | | | |
|---|---|---|---|
| 6,308,205 B1 * | 10/2001 | Carcerano et al. | 709/221 |
| 6,479,973 B2 | 11/2002 | Saito et al. | |
| 6,780,047 B1 | 8/2004 | Laity et al. | |
| 7,004,787 B2 | 2/2006 | Milan | |
| 7,375,285 B2 | 5/2008 | Chiang | |
| 2001/0034671 A1 * | 10/2001 | Luke et al. | 705/28 |
| 2006/0097852 A1 | 5/2006 | Lammers et al. | |
| 2007/0011227 A1 * | 1/2007 | Johnson | 709/203 |

FOREIGN PATENT DOCUMENTS

| | | |
|---|---|---|
| EP | 0 507 225 A | 10/1992 |
| EP | 1 429 348 A | 6/2004 |
| EP | 1493630 | 1/2005 |

OTHER PUBLICATIONS

PCT: International Preliminary Report on Patentability of PCT/IB08/002060 (related application); Dec. 7, 2009; 9 pgs.

PCT: International Search Report and Written Opinion of PCT/IB2008/002060 (related application); Feb. 16, 2009; 12 pgs.

PCT: International Search Report of PCT/IB2008/002056; International Publication No. WO/2008/149235; Jan. 7, 2009.

PCT: Written Opinion of the International Searching Authority of PCT/IB2008/002056; International Publication No. WO/2008/149235; Jan. 7, 2009.

* cited by examiner

SYSTEM FOR INTEGRATING A PLURALITY OF MODULES USING A POWER/DATA BACKBONE NETWORK

CROSS-REFERENCE TO RELATED APPLICATIONS

This application claims the benefit of U.S. Application Ser. No. 60/933,358, filed Jun. 6, 2007, and entitled VIRTUAL ELECTRICAL AND ELECTRONIC DEVICE INTERFACE AND MANAGEMENT SYSTEM, which is incorporated herein by reference.

TECHNICAL FIELD

The following disclosure relates to control systems and, more particularly, to providing and controlling modular functionality over a power/data backbone.

BACKGROUND

It is well known that power and communication components, particularly in vehicles, are frequently formed as islands of automation in which communication and power distribution with other islands is limited or nonexistent. For example, a vehicle's electrical system is typically limited to an inflexible wiring harness and isolated components that are difficult to troubleshoot and repair. Therefore, a need exists for a system that is able to provide and control an integrated power and data network and corresponding modular components.

SUMMARY

In one embodiment, a Virtual Electrical and Electronic Device Interface and Management System (VEEDIMS) for a vehicle is provided. The VEEDIMS comprises a backbone network, a controller, a plurality of modules, and at least one device. The backbone network is formed by a plurality of cables, wherein each cable is configured to simultaneously carry digital data and power. The controller is coupled to the backbone network and configured to execute a plurality of control instructions. The plurality of modules are coupled to the controller via the backbone network and configured to receive data and all power needed by the modules via the backbone network, wherein the modules are configured to receive control signals from the controller based on the plurality of control instructions. The device is coupled to a first module of the plurality of modules via a direct input/output (I/O) interface positioned in the first module, wherein a device specific driver contained in the first module provides a communications interface between the device and a generic VEEDIMS controller driver in the controller.

In another embodiment, a Virtual Electrical and Electronic Device Interface and Management System (VEEDIMS) is provided. The VEEDIMS comprises a first controller, an energy source, a first switch, and a first module. The first controller has a first power interface, a first network/power interface, a first processor coupled to the first power and first network/power interfaces, and a first memory containing a plurality of instructions executable by the first processor, the instructions including controller instructions adapted to control a plurality of modules. The energy source is coupled directly to the first power interface via a first cable adapted to carry only power. The first switch has a second power interface coupled directly to the energy source via a second cable adapted to carry only power, and a second network/power interface coupled directly to the first network/power interface via a third cable adapted to simultaneously carry both power and data. The first module of the plurality of modules has a third network/power interface coupled directly to the second network/power interface via a fourth cable adapted to simultaneously carry both power and data, a device input/output (I/O) port, a second processor coupled to the third network/power interface and the device I/O port, and a second memory containing a plurality of instructions executable by the second processor, the instructions including driver instructions adapted to enable communications between the first module and a device coupled to the first module via the device I/O port, wherein the first module is adapted to provide a communication interface between the device and the first controller.

In yet another embodiment, a Virtual Electrical and Electronic Device Interface and Management System (VEEDIMS) support architecture is provided. The VEEDIMS support architecture comprises a module and a controller. The module is positioned in a vehicle and configured to couple to a device via an input/output (I/O) interface compatible with the device and configured to couple to the controller via a cable adapted to simultaneously carry bi-directional data and uni-directional power to the module, wherein the module has a first processor and a first memory containing a first instruction set executable by the first processor, the first instruction set including instructions for providing a HyperText Transfer Protocol (HTTP) server, and wherein the first memory further contains a documentation set containing a service history of the module and a bill of materials for at least one of the module and the device that is accessible via the HTTP server. The controller is positioned in the vehicle and has a second processor and a second memory containing a second instruction set executable by the second processor, the second instruction set including instructions for receiving data from the module and storing the data in the second memory.

BRIEF DESCRIPTION OF THE DRAWINGS

For a more complete understanding, reference is now made to the following description taken in conjunction with the accompanying Drawings in which.

DETAILED DESCRIPTION

Figure 1:
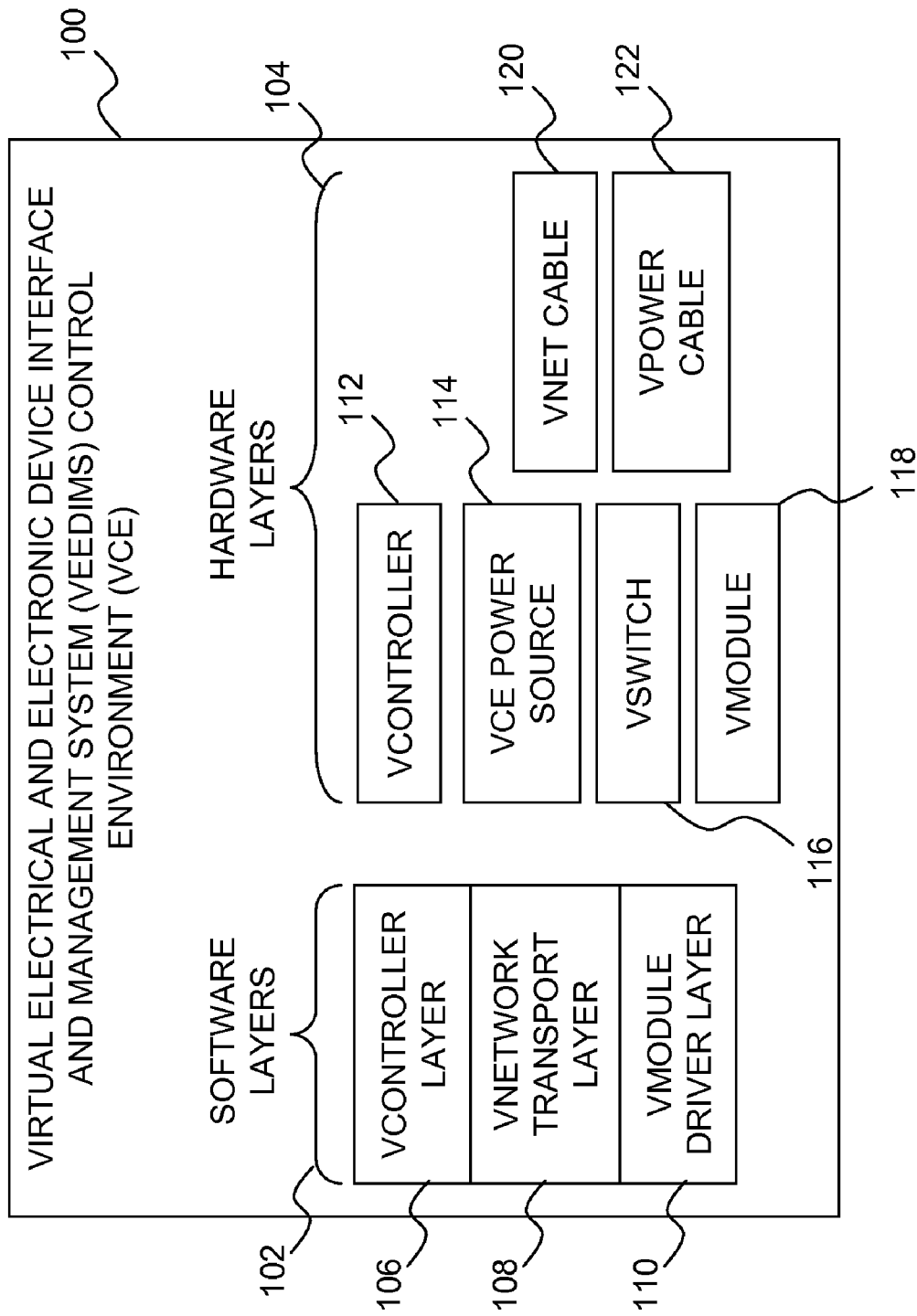
FIG. 1 illustrates software and hardware layers that may be present in one embodiment of a Virtual Electrical and Electronic Device Interface and Management System (VEEDIMS) control environment (VCE)

Referring now to the drawings, wherein like reference numbers are used herein to designate like elements throughout, the various views and embodiments of system and method for integrating a plurality of modules using a power/data backbone network are illustrated and described, and other possible embodiments are described. The figures are not necessarily drawn to scale, and in some instances the drawings have been exaggerated and/or simplified for illustrative purposes only. One of ordinary skill in the art will appreciate the many possible applications and variations based on the following examples of possible embodiments.

The following disclosure describes providing and controlling an integrated power and data network and corresponding modular components to all or portions of a vehicle or a structure. The term "vehicle" may include any artificial mechanical or electromechanical system capable of movement (e.g., motorcycles, automobiles, trucks, boats, and aircraft), while the term "structure" may include any artificial system that is not capable of movement. Although both a vehicle and a structure are used in the present disclosure for purposes of example, it is understood that the teachings of the disclosure may be applied to many different environments and variations within a particular environment. Accordingly, the present disclosure may be applied to vehicles and structures in land environments, including manned and remotely controlled land vehicles, as well as above ground and underground structures. The present disclosure may also be applied to vehicles and structures in marine environments, including ships and other manned and remotely controlled vehicles and stationary structures (e.g., oil platforms and submersed research facilities) designed for use on or under water. The present disclosure may also be applied to vehicles and structures in aerospace environments, including manned and remotely controlled aircraft, spacecraft, and satellites.

Referring to FIG. 1, in one embodiment, a Virtual Electrical and Electronic Device Interface and Management System (VEEDIMS or simply denoted herein by a "V" prefix) control environment (VCE) 100 is illustrated. The VCE 100 may include software and hardware components arranged into software layers 102 and hardware layers 104 to provide distributed and local level intelligence. Software layers 102 may include a VEEDIMS controller (VController) layer 106, a VEEDIMS network (VNet) transport layer 108, and a VEEDIMS module (VModule) driver layer 110. Hardware layers 104 may include one or more VControllers 112, a VCE power source 114, VEEDIMS switches (VSwitches) 116, and VModules 118, with connections between the various hardware components provided by VNet cables 120 and/or VEEDIMS power (VPower) cables 122.

The software layers 102 provide control instructions for the hardware layers 104 and enable the hardware layers to operate, gather data, monitor and report events, and perform other functions needed to provide a VEEDIMS operating environment (VOE). The actual physical location of functionality provided by the software layers 102 may vary depending on the configuration of the VCE 100. For example, certain software functions may be located in the VController 112 in some configurations, but may be located in the VModule 118 in other configurations.

The VController layer 106 includes a VEEDIMS controller kernel that, among other functions, executes VEEDIMS controller drivers (not shown). The VEEDIMS controller drivers are software modules that are configured to interact with VModules 118 which, as will be described below, directly operate, manage, and monitor electrical and electronic systems operating within the VCE 100. The VEEDIMS controller drivers are high level drivers that may be relatively generic, with more specific drivers (e.g., in the VModule driver layer 110) provided in lower software layers that interpret communications between the generic high level drivers and physical component interfaces.

The VNet transport layer 108 may be based on an open protocol, such as an optimized version of the Ethernet protocol, and carries broadcast and/or addressable VNet traffic to support the high speed real-time operational capabilities of the VCE 100. The VNet traffic is packet-based, and the term "packet" as used in the present disclosure may include any type of encapsulated data, including datagrams, frames, packets, and the like, and the encapsulated information may include voice, video, data, and/or other information. Some or all of the VNet traffic may be encrypted.

The VNet transport layer 108, in conjunction with a VNet backbone (described below), enables network communications to be integrated down to the discrete input/output (I/O) level using a high bandwidth network. This is in contrast to traditional vehicle networking technology that generally applies networking to accomplish very specific purposes with respect to a given subsystem in the vehicle. In addition to Ethernet, other protocols that may be used by the VNet transport layer 108 include the Transmission Control Protocol/Internet Protocol (TCP/IP), User Datagram Protocol (UDP), HyperText Transfer Protocol (HTTP), Modbus (a serial communication protocol published by Modicon), Bluetooth, Firewire, Controller Area Network (CAN), and Flexray. For example, VEEDIMS may use Modbus TCP as the de-facto Ethernet communication standard and Modbus as the de-facto serial communication standard, with other application specific lower level protocols accessible using Modbus TCP as the gateway.

The VModule driver layer 110 is configured to interact with internal hardware of the VModules 118 and equipment that is physically connected to the VModule internal hardware, as will be described later in greater detail. These may be device specific drivers that are written so that a particular subsystem (e.g., a VModule 118 and a device/component) or device can function within the VCE 100.

The hardware layers 104 provide a hardware platform on which the software layers 102 may be executed and also provide communication and power links between various subsystems and components. The VControllers 112 run the VEEDIMS controller kernel, which is part of the VController layer 106 and is responsible for managing the VOE. The VControllers 112 are generally responsible for mission critical tasks and may have functionally overlapping responsibilities to minimize problems that may be caused when a VController fails.

One or more VCE power sources 114 may provide electrical energy to all components within the VCE 100, either directly or indirectly. The VCE power source 114 may be coupled to an electrical grid formed by VNet cables 120 and VPower cables 122, which are described below. The electrical grid may be a high quality (e.g., aerospace level) grid that uses supervised magnetic hydraulic circuit breakers and cycle by cycle or fold back current limiting electronics to protect components and wiring and to speed diagnostics and fault recovery. Supervision gives the operator of a vehicle an immediate indication of the reason for an electrical system failure and may include steps to be taken to resolve the problem. Current fold back may be used to limit an electrical fault to a subsystem, thereby containing the fault and providing the vehicle with the maximum possible functionality despite the occurrence of the fault.

The VSwitch 116 includes a physical enclosure that contains electronics and connectors needed to enable the VSwitch to act as a conduit for VNet traffic between the VController 112 and VModules 118. The VSwitch also distributes power (i.e., VPower current) received from the VCE power source 114 to the VModules.

The VModule 118 is a discrete electrical/electronics interface module designed to enable any electrical/electronic device to have digital data and power connectivity to the VCE 100 via a VNet backbone (e.g., a network or a multi-drop communication bus) formed by the VSwitches 116 and VNet cables 120. In some embodiments, the VModules 118 may include at least limited control functionality.

Interconnections in the VCE 100 are provided by VNet cables 120 and VPower cables 122. A VNet cable 120 is a physical VNet distribution cabling medium that is capable of providing a digital signal pathway and direct current (DC) voltage interconnections between the VControllers 112, VSwitches 116, and VModules 118. A VPower cable 122 is a physical power distribution cabling medium dedicated to delivering high amperage DC voltage from the VCE power source 114 to the VControllers 112 and VSwitches 116.

The functionality provided by VNet cables 120 and VPower cables 122 may vary depending on the particular VCE 100. For example, some VCE implementations may only need to support twelve volt DC power applications, while other implementations may require higher voltages (e.g., twenty-four volts DC, forty-eight volts DC, or 110/220 VAC at 50/60 Hz). In VCE implementations having higher power requirements, dedicated versions of VSwitches 116, VModules 118, VNet cables 120, and VPower cables 122 may be provided. The dedicated versions may be identified by the use of color coded cabling and differently configured and keyed connectors to eliminate the possibility of connecting VSwitches 116 and VModules 118 that are not power compatible.

One embodiment of a VNet cable 120 is formed as an integrated single cable connector assembly that combines power distribution and data networking capabilities. The assembly may include a water-resistant connector that meets a particular ingress protection standard (e.g., qualifies as an IP-67 or similar level protection seal) that provides a rugged interface to a VModule 118 or a sub-system within the VCE 100. The connector may have a particular power distribution level as described above (e.g., twelve, twenty-four, or forty-eight volts DC or 110/220 VAC 50/60) and may include a neutral contact capable of carrying the required current and a network connector designed for use with multiple high performance protocols. The VNet cable connector may support various levels of Ethernet (e.g., 10baseT, 100baseT, and 1000baseT). Other embodiments may support protocols such as the Universal Serial Bus (USB) protocol, Firewire, CAN, and Flexray in addition to or as alternatives of Ethernet. The VNet cable assembly's connector shell may be manufactured to aerospace standards from a corrosion resistant material with a temperature rating suitable for harsh application environments. A matching jacketed cable assembly may be used that has shielding sufficient to maintain crosstalk or other noise at a level that will not interfere with VNet data traffic.

The VNet cable 120 integrates neutral wiring into a single cable concept to prevent ground loops, reduce noise, and improve reliability. Traditionally, cars, boats, airplanes, and similar environments have used the vehicle's metal chassis as a return path for the DC operating voltage. This is done mainly as a cost saving measure, but can lead to downstream failures. For example, the electrical connections to ground can be at different galvanic potentials depending on the finish and composition of the materials used, and this can accelerate corrosion in an already hostile operational environment. The electrical resistance of circuits can vary over time, leading to varying voltages running through the same common ground, which often induces electrical noise between circuit paths. Accordingly, by using the VNet cable 120, VEEDIMS minimizes or eliminates these problems due to the VNet cable's configuration as a protected ground wire with gas tight, high reliability connections designed to isolate the electrical circuit return path and minimize or eliminate induced electrical cross talk.

It is understood that many different types of communication media may be used in addition to or as an alternative for the VNet cable 120, including copper and optic fiber. If optic fiber is used, the VModule 118 or another component of the VCE 100 may perform fiber-to-copper and copper-to-fiber conversions.

Figure 2:
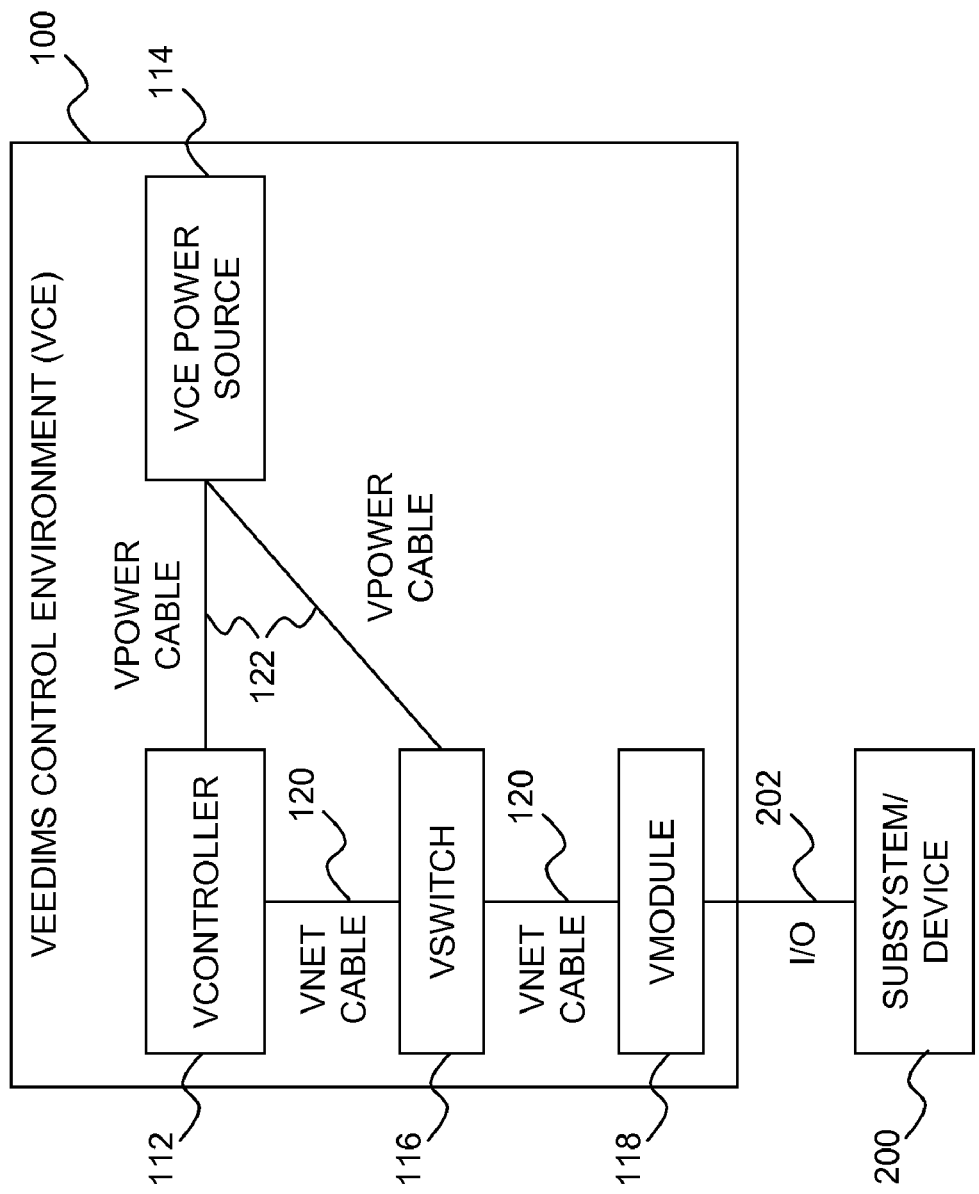
FIG. 2 illustrates one possible configuration of the hardware layers in an embodiment of the VCE of FIG. 1.

With additional reference to FIG. 2, in another embodiment, one possible configuration of the hardware layers 104 of FIG. 1 is illustrated. In the present example, the VController 112 is coupled to the VCE power source 114 via a VPower cable 122 and to a VSwitch 116 via a VNet cable 120. The VCE power source 114 is also coupled to the VSwitch 116, as the VNet cable 120 may not be carrying power and/or may not be capable of providing the amount of power needed to power the VSwitch and components that depend on the VSwitch for power, such as the VModule 118. The VModule 118 is connected only to the VSwitch 116, although it may be connected to other VModules as described below. Although not shown, the VController 112 may be directly connected to the VModule 118 in some embodiments (i.e., without an intervening VSwitch 116). One or both of the VController 112 and VSwitch 116 may communicate with the VCE power source 114 to determine power availability, to pass power consumption needs back to the VCE power source, and to control power levels.

In addition to being coupled to the VSwitch 116, the VModule 118 may be coupled to a subsystem/device 200 via an input/output (I/O) interface 202, which may be a VNet cable 120 or another bus-based, analog, and/or digital I/O interface. Although shown as outside of the VCE 100 in the present example, the subsystem/device 200 may be part of the VCE. The VModule 118 may be integrated with the subsystem/device 200 to form a single subsystem or may be separate as shown.

The VCE 100 may support "plug and run" functionality by automatically integrating the VModule 118 or subsystem/device 200 with the VCE after the VModule or subsystem/device is plugged into the VNet backbone. The integration status of the VModule 118 or subsystem/device 200 with the VCE 100 may be indicated by a light emitting diode (LED) or another indicator. For example, when the subsystem 200 is coupled to the VNet backbone, an LED color of the subsystem may indicate the subsystem's integration status. A red LED may indicate that the subsystem 200 is not integrated with the VCE 100 (e.g., due to a lack of available power) and a green LED may indicate that the subsystem is integrated and operational. If not integrated when first plugged in, the LED color may change from red to green if, for example, power becomes available for the subsystem 200.

The VCE 100 may support self-publishing. In self-publishing, when a new component such as the VModule 118 or a VEEDIMS enabled subsystem or device (e.g., one that has at least basic VModule functionality integrated therein) is connected to the VNet backbone, the new component publishes its "personality" (e.g., power needs, capabilities, and other information). Alternatively, the VController 112 or another component may query the new component to determine its personality. If the new component is a member of a class (as described later), the VCE 100 may already have certain information (e.g., maximum power consumption) about the new component. Accordingly, rather than adding the new component as a part to the VCE 100 in the traditional sense, which often requires entering information about the new component into the VCE, the VCE enables a new component to simply be plugged into the VNet backbone and then identifies relevant information about the new component.

The VCE 100 may support automatic updating. Automatic updating, when a new component such as a VModule 118 or a VEEDIMS enabled subsystem or device (e.g., one that has at least basic VModule functionality integrated therein) is connected to the VNet backbone, the new component may send information to update the higher control levels of the VOE regarding the new component. This avoids human error in entering information regarding the new component.

The VCE 100 may support efficient power use through power splitting. In power splitting, when a new component such as a VModule 118 or a VEEDIMS enabled subsystem or device (e.g., one that has at least basic VModule functionality integrated therein) is connected to the VNet backbone, the VController 112 or another component such as the VSwitch 116 may make a decision as to whether sufficient power exists to operate the new component. This decision may be based on the new component's operating specifications, which may be published by the new component when it is connected or may be obtained by querying the new component. If enough power is available, the amount of power available is decremented and the new component is accepted into the VCE 100 as active. If there is not enough power available, either because the new component's power requirements exceed the available power or some power is being reserved and is not available for use by the new component, the new component is denied access to the VCE 100 or is placed in an inactive status until enough power is available.

If the new component is not VEEDIMS enabled, the VModule 118 into which it is plugged may run tests to determine the new component's power usage or may simply allocate a certain level of power, assuming that the power is available. For example, if a non-VEEDIMS enabled fan is plugged into the VModule 118, the fan is not capable of publishing information about its personality and cannot be queried to find out such information. Accordingly, the VModule 118 may monitor the fan's operation to identify power and current requirements, temperature, and similar information to build a profile for the fan and to prevent short circuits and other problems. The VModule 118 may then update the VOE using the profile information, thereby serving as a VEEDIMS proxy to provide the non-VEEDIMS enabled fan with at least basic VEEDIMS functionality.

Power splitting may also make the VCE 100 more environmentally friendly as power consumption can be monitored and controlled at different levels of the VCE to ensure that it is being used efficiently. This control may be used to identify high power requirement components for replacement and to generally regulate power consumption within the VCE 100.

The VCE 100 may support software and hardware redundancy. For example, hardware redundancy may be provided by using multiple hardware components (e.g., VControllers 112) for mission critical operations and by providing dual ports and other safeties for the VControllers 112, VSwitches 116, and VModules 118. Some or all of the VControllers 112, VSwitches 116, and VModules 118 may also use heartbeat or other notification methods to enable the VCE 100 to detect software, hardware, and link failure and to adjust accordingly.

Figure 3:
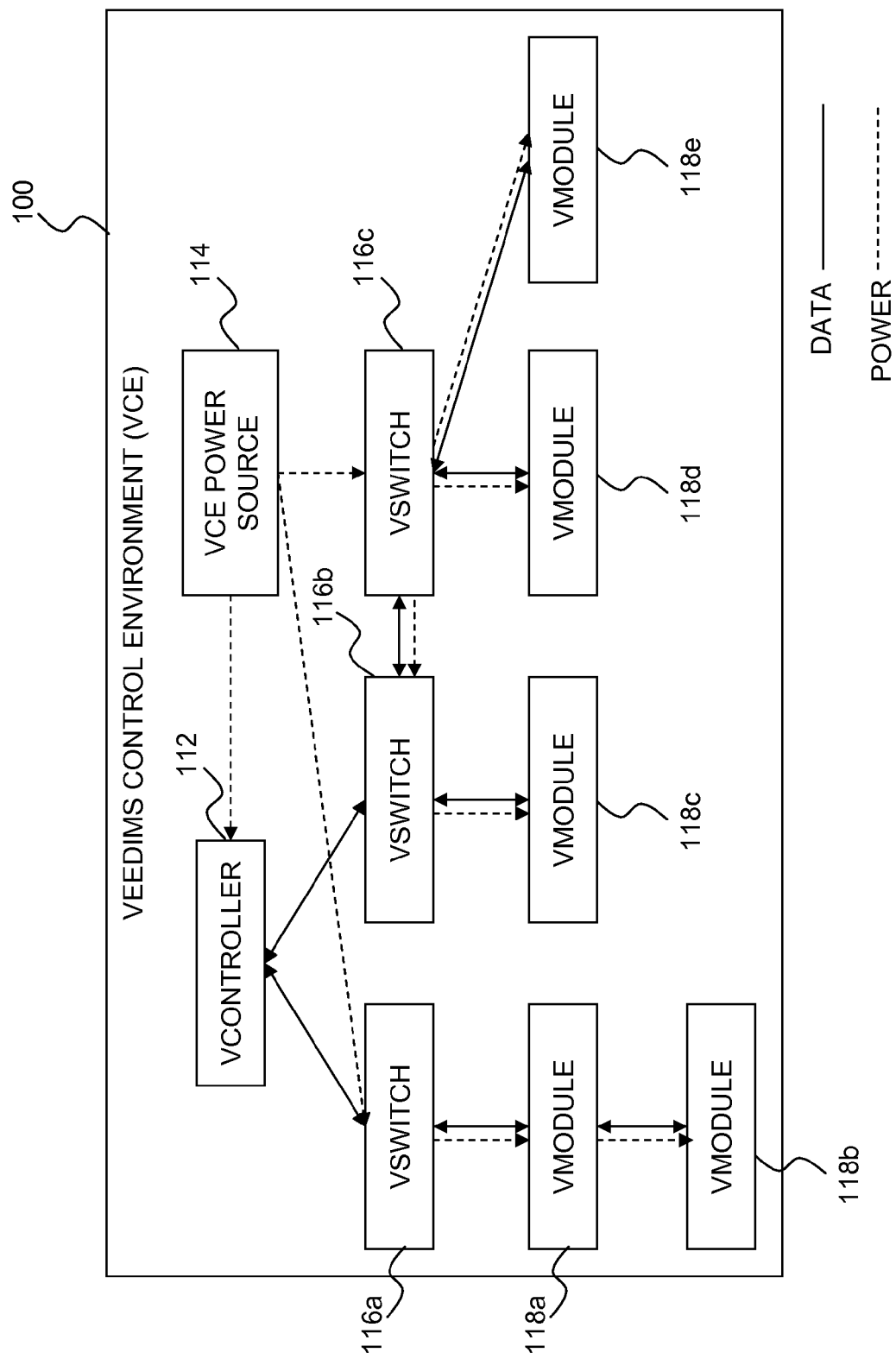
FIG. 3 illustrates another possible configuration of the hardware layers in an embodiment of the VCE of FIG. 1.

With additional reference to FIG. 3, in yet another embodiment, one possible configuration of the VCE 100 of FIG. 1 illustrates the ability to couple multiple VSwitches 116 and VModules 118 to one another (i.e., daisy chain). The ability to daisy chain VSwitches 116 eliminates the need to run separate VNet cables 120 and VPower cables 122 from each VSwitch back to the VController 112 and the VCE power source 114, respectively, in the VCE 100. Similarly, the ability to daisy chain VModules 118 eliminates the need to run separate VNet cables 120 from each VModule back to the VSwitch 116. This enables the cabling to be run more efficiently, as the VCE 100 may be configured with multiple VSwitches 116 and VModules 118 distributed throughout a vehicle or other environment.

Daisy chaining may include power, data, or both power and data. One or more of the VSwitches 116 and VModules 118 may include an Ethernet switch configured to pass data through to other VSwitches and VModules to enable VNet traffic daisy chaining. Furthermore, power may be sent in one direction of a daisy chain and data may be sent in the other direction. Accordingly, a high level of flexibility is available for any given configuration of the VCE 100 while providing a distributed and de-coupled (i.e., modular) system.

In the present example, VController 112 is coupled to VCE power source 114 for power (dotted line) and to VSwitches 116a and 116b for VNet data communications (solid lines). VSwitch 116a supplies VNet data and power to VModule 118a, which in turn supplies VNet data and power to daisy chained VModule 118b. VSwitch 116b is coupled to VSwitch 116c and VModule 118c and supplies VNet data to VSwitch 116c and both VNet data and power to VModule 118c. Note that VSwitch 116b is not coupled directly to VCE power source 114. VSwitch 116c is coupled to VModules 118d and 118e as well as VSwitch 116b. VSwitch 116c supplies power to VSwitch 116b and both VNet data and power to VModules 118d and 118e. Although not shown, the VController 112 and/or VSwitches 116 may communicate with the VCE power source 114 to determine power availability, to pass power consumption needs back to the VCE power source, and to control power levels.

Additional VSwitches 116 (not shown) may be coupled to VController 112 and/or daisy chained from VSwitches 116a-116c, and additional VModules 118 (not shown) may be coupled to one of the VSwitches 116a-116c or daisy chained from VModules 118a-118e. Furthermore, multiple VSwitches 116 may be coupled to a single VSwitch and multiple VModules 118 may be coupled to a single VModule. Constraints to the number of VSwitches 116 and VModules 118 that can be connected may include the number of available ports and the amount of power needed by the chained components versus the amount of power available to the chain. The number of connections required for relatively long chains may increase the difficulty of replacing cables and components.

Although not shown, it is understood that many different network topographies may be used. For example, both ring network configurations and star network configurations may be used in the VCE 100.

Figure 4:
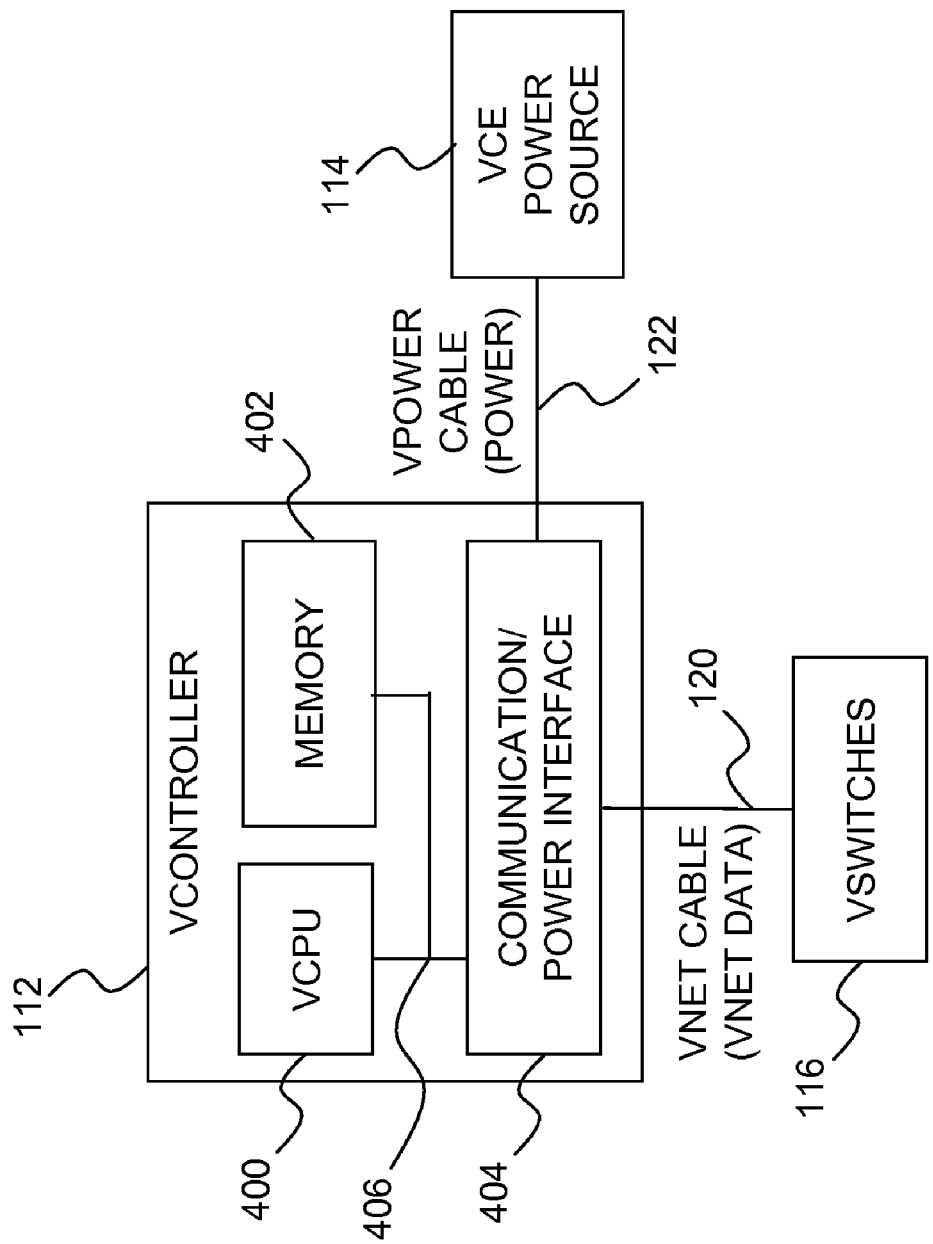
FIG. 4 is a block diagram illustrating one embodiment of a VEEDIMS controller that may be used in the VCE of FIG. 1.

Referring to FIG. 4, one embodiment of the VController 112 of FIG. 1 is illustrated. The VController 112 includes a VEEDIMS central processing unit (VCPU) 400, a memory 402, a communication/power interface 404, and one or more internal communication links 406. It is understood that the configuration and types of components of the VController 112 may vary depending on the particular VCE 100 in which the VController is to be used. For example, in a vehicular environment, the VController 112 may be designed as a relatively compact integrated circuit board with the minimum number of ports that are needed to provide the desired functionality. In contrast, an environment such as a structure (e.g., a home or office building) may use a less compact VController 112 as space is generally less important. Furthermore, the VController 112 may be relatively generic for use in many different VCEs, or may be customized for use in a particular VCE 100 having highly specific requirements (e.g., an aerospace environment).

The VCPU 400 may actually represent a multi-processor or a distributed processing system; the memory 402 may include different levels of cache memory, main memory, hard disks, and remote storage locations; and the communication/power interface 404 may represent multiple interfaces dedicated to receiving, splitting/combining data and power, and transmitting. For example, the communication/power interface 404 may have a first interface (not shown) that receives power from the VCE power source 114 via a VPower cable 122 and a second interface (not shown) that communicates with one or more VSwitches 116 via a VNet cable 120. In some embodiments, the VController 112 may also send power to the VSwitches 116 via the VNet cable 120. The data transmission capabilities of the communication/power interface 404 may provide both wireline (e.g., the VNet cable 120) and wireless functionality.

Instructions for the VController layer 106 (e.g., the VEEDIMS controller kernel and VEEDIMS controller drivers) and VNet transport layer 108 may be stored in the memory 402 and executed by the VCPU 400. The VController layer 106 functionality may be handled entirely by the VController 112, or some or all of the VController layer functionality may be pushed down to the VSwitch 116 level or lower. As will be discussed later, additional functionality may be provided by the VController 112 to allow users to interact with the VController in order to control parameters of the VCE 100 and to obtain data regarding the VCE. If multiple VControllers 112 are present in the VCE 100, they may include software to provide load balancing functionality and to ensure redundancy if one of the VControllers fails.

Figure 5:
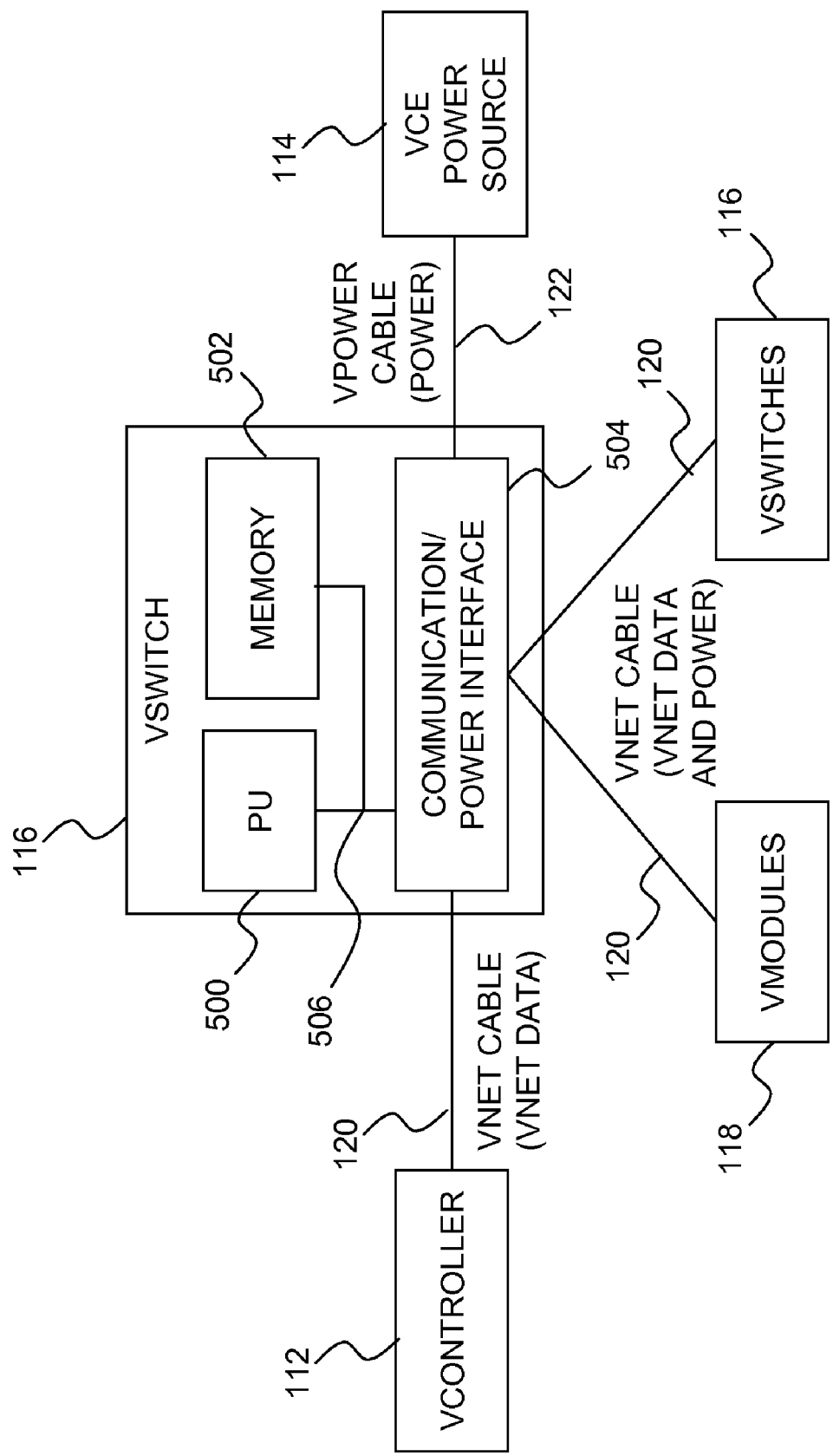
FIG. 5 is a block diagram illustrating one embodiment of a VEEDIMS switch that may be used in the VCE of FIG. 1.

Referring to FIG. 5, one embodiment of the VSwitch 116 of FIG. 1 is illustrated. The VSwitch 116 includes a processing unit (PU) 500, a memory 502, a communication/power interface 504, and one or more internal communication links 506. It is understood that the configuration and types of components of the VSwitch 116 may vary depending on the particular VCE 100 in which the VSwitch is to be used. For example, in a vehicular environment, the VSwitch 116 may be designed as a relatively compact integrated circuit board with the minimum number of ports that are needed to provide the desired functionality. In contrast, an environment such as a structure (e.g., a home or office building) may use a less compact VSwitch 116 as space is generally less important. Furthermore, the VSwitch 116 may be relatively generic for use in many different VCEs, or may be customized for use in a particular VCE 100 having highly specific requirements (e.g., an aerospace environment).

The PU 500 may actually represent a multi-processor or a distributed processing system and the memory 502 may include different levels of cache memory, main memory, hard disks, and remote storage locations. In the present example, the PU 500 and memory 502 may be formed on a circuit board with an embedded system such as is made by Netburner, Inc., of San Diego, Calif. The circuit board may include multiple ports for power, communications, and other connections.

The communication/power interface 504 may represent multiple interfaces dedicated to receiving VNet data traffic and power, splitting/combining VNet data traffic and power, and transmitting VNet data traffic and power. For example, the communication/power interface 504 may have a first interface (not shown) that receives power from the VCE power source 114 via a VPower cable 122 and passes the power to the PU 500 and memory 502, and a second interface (not shown) that communicates with the VController 112, VSwitches 116, and VModules 118 via VNet cables 120.

The second interface may be configured to recognize that the VNet cable 120 linking the VSwitch 116 to the VController 112 does not have a power component, or the VNet cable linking the two may be inserted into a designated slot in the VSwitch that does not support power. The communication/power interface 504 may include a connection between the first and second interfaces to pass power received via the VPower cable 122 to the VNet cables 120 that are coupled to other VSwitches 116 and VModules 118. If the VNet cables 120 have two separate channels for data and power, the first and second interfaces may be independently coupled to the appropriate channel. If the data and power are carried in a single signal (e.g., at separate frequencies), the first and second interfaces may merge the VNet data traffic and power signals to create a single outgoing signal.

The first and second interfaces of the communication/power interface 504 may also be configured to allow some or all of the VNet data traffic and power to pass through the VSwitch 116. For example, if another VSwitch 116 is coupled to an input/output port of the communication/power interface 504 via a VNet cable 120, the communication/power interface may pass some of the received power through to the other VSwitch as well as some or all of the received VNet data traffic. The communication/power interface 504 may also include filters or other control circuitry that enable the VSwitch 116 to control the delivery of power via the VNet cable 120. The data transmission capabilities of the communication/power interface 504 may provide both wireline (e.g., the VNet cable 120) and wireless functionality.

Instructions for the VNet transport layer 108 and for interacting with the VController layer 106 may be stored in the memory 502 and executed by the PU 500 to establish the VSwitch 116 as a Multiple Application Execution Interface (MAXI) in the VCE 100. In some embodiments, the VSwitch 116 may contain instructions for at least a portion of the VController layer 106. In other embodiments, the VSwitch 116 may provide only basic VNet data traffic switching (e.g., in a VCE 100 having individually addressable VModules 118) and may simply pass any remaining power through to connected VSwitches and VModules after its own power consumption needs are met.

Figure 6:
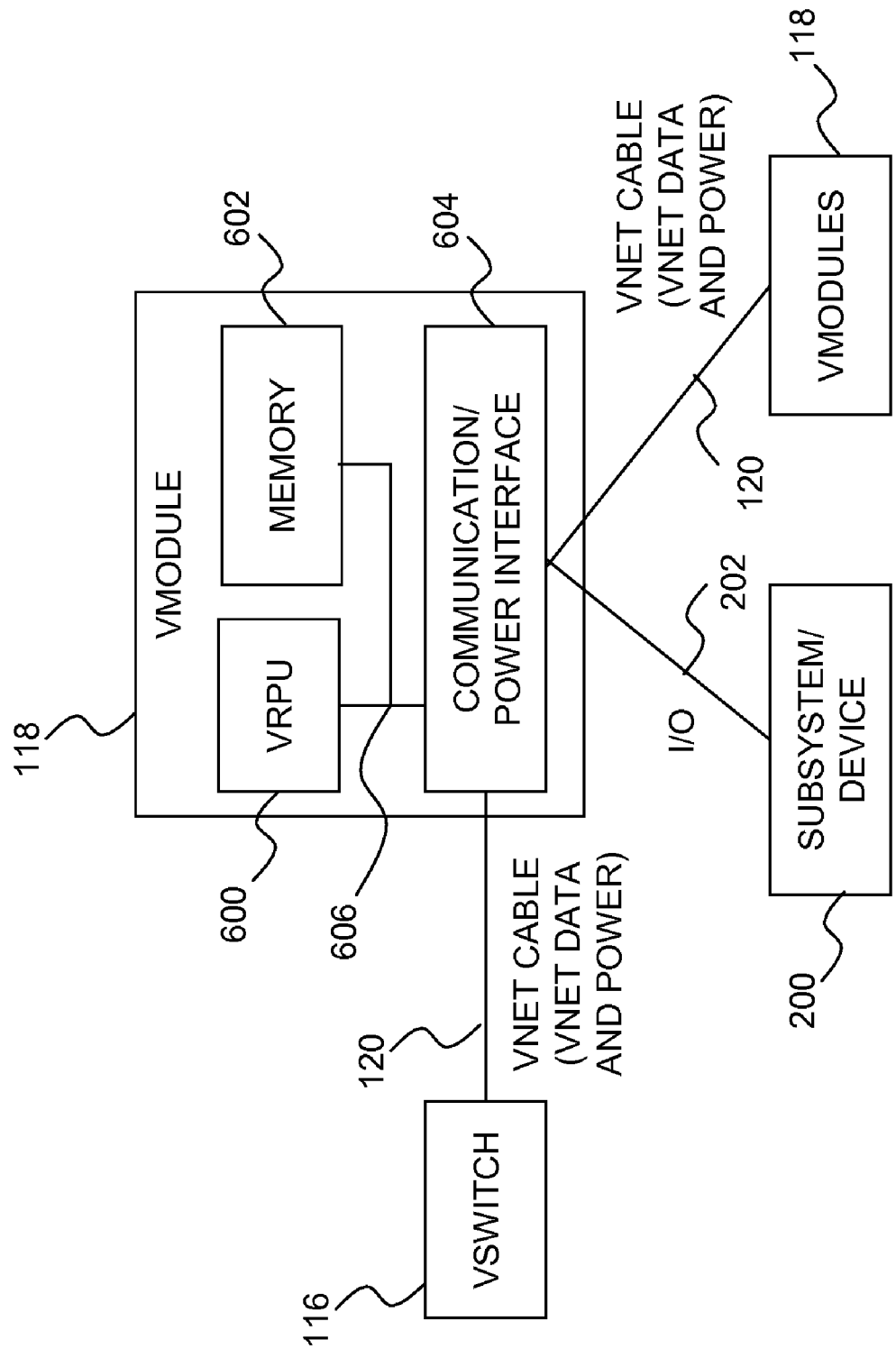
FIG. 6 is a block diagram illustrating one embodiment of a VEEDIMS module that may be used in the VCE of FIG. 1.

Referring to FIG. 6, one embodiment of the VModule 118 of FIG. 1 is illustrated. As described previously, the VModule 118 is a discrete electrical/electronics interface module designed to enable any electrical/electronic device to have data and power connectivity to the VCE 100 via the VNet backbone formed by the VSwitches 116 and VNet cables 120. Generally, the VModule 118 is designed to provide a hardware (and, in some applications, a software) abstraction layer to the VOE so that generic software control drivers operating at the VController layer 106 residing in the VController 112 can control such low level devices as, for example, instrument panel gauges that might be found in motorized vehicles.

The VModule 118 includes a VEEDIMS remote processing unit (VRPU) 600, a memory 602, a communication/power interface 604, and one or more internal communication links 606. It is understood that the configuration and types of components of the VModule 118 may vary depending on the particular VCE 100 in which the VModule is to be used. For example, in a vehicular environment, the VModule 118 may be designed as relatively compact integrated circuit board with the minimum number of ports that are needed to provide the desired functionality. In contrast, an environment such as a structure (e.g., a home or office building) may use a less compact VModule 118 as space is generally less important. Furthermore, the VModule 118 may be relatively generic for use in many different VCEs, or may be customized for use in a particular VCE 100 having highly specific requirements (e.g., an aerospace environment).

The VRPU 600 may actually represent a multi-processor or a distributed processing system and the memory 602 may include different levels of cache memory, main memory, hard disks, and remote storage locations. In the present example, the VRPU 600 and memory 602 may be formed on a circuit board with an embedded system such as is made by Netburner, Inc., of San Diego, Calif. The circuit board may include multiple ports for power, communications, and other connections.

The communication/power interface 604 may represent multiple interfaces dedicated to receiving VNet data traffic and power, splitting/combining VNet data traffic and power, and transmitting VNet data traffic and power. For example, the communication/power interface 604 may have a first interface (not shown) that receives power from the VNet cable 120 coupled to the VSwitch 116 and a second interface (not shown) that receives and transmits VNet data via the same VNet cable. If the VNet cable has two separate channels for data and power, the first and second interfaces may be independently coupled to the appropriate channel. If the data and power are combined in a single signal (e.g., at separate frequencies), the first and second interfaces may filter the incoming signal to separate the data and power.

The first and second interfaces of the communication/power interface 604 may be configured to allow some or all of the VNet data traffic and power to pass through the VModule 118. For example, if another VModule 118 is coupled to an input/output port of the communication/power interface 604 via a VNet cable 120, the communication/power interface 604 may pass some of the received power through to the other VModule as well as some or all of the received VNet data traffic. The data transmission capabilities of the communication/power interface 604 may provide both wireline (e.g., VNet cable 120) and wireless functionality.

The first and second interfaces of the communication/power interface 604 may connect the VModule 118 with one or more subsystems/devices 200. For example, one or both of the first and second interfaces may form the I/O interface 202 of FIG. 2, or the communication/power interface 604 may include one or more other bus-based, analog, and/or digital I/O interfaces for communication and power distribution to the subsystems/devices 200. The VModule 118 may perform exception reporting for faults in attached subsystems/devices 200 using, for example, I/O scanning via the I/O interface 202. In some embodiments, the communication/power interface 604 of the VModule 118 may serve as a gateway to provide access for the attached subsystems/devices 200 to external wireless devices (not shown).

Instructions for the VNet transport layer 108, VModule driver layer 110, and for interacting with the VController layer 106 may be stored in the memory unit 602 and executed by the VRPU 600 to configure the VModule 118 as a MAXI in the VCE 100. In some embodiments, the VModule 118 may contain instructions for at least a portion of the VController layer 106.

The VModule driver layer 110 includes dedicated device interface specific driver software that provides an interface between the VOE and the subsystems/devices 200 coupled to the VModule 118. For example, in a VCE 100 such as a vehicle, signal data from discrete sensors such as oil temperature, pressure, water temperature, etc., are captured from subsystems/devices 200 via specific drivers of the VModule driver layer 110, aggregated, and processed by the VModule 118. The VModule 118 takes the sensor data and sends it as VNet traffic (e.g., as a VEEDIMS compatible data stream) over the VNet backbone to the VController 112. It is understood that sensor data that is not VEEDIMS compatible may be converted by the VModule 118 prior to sending it to the VController 112. In a more specific example, a VController layer driver in the VController layer 106 may be developed to drive a tachometer, speedometer, and a series of other gauges in order to inform an operator of the vehicle's current status. To achieve this, discrete sensors connected to the VModule 118 generate digital or analog signal data, which is aggregated and processed by the VModule based on the corresponding VModule driver layer 110. The VModule 118 transmits the processed signal data to the VController 112 via the VNet backbone for processing by the VCPU 400. The VController 112 can then present the information to the vehicle's operator.

The VModule 118 enables new subsystems and components to be integrated with the VOE without requiring high level changes. For example, to support new physical electrical/electronic equipment and any corresponding software, a driver may be written for the VModule 118. The driver, which would be in the VModule driver layer 110, would be written to conform to the VEEDIMS standard interface protocol used by the VController layer 106. The standard interface protocol may be available via a VEEDIMS development kit (VDK) or otherwise published for use by developers. This approach is conceptually similar to the idea of a generic disk drive controller driver that is written in a UNIX operating system environment for controlling disk drives. When a new disk drive is developed, regardless of any new operational capabilities at its hardware level, the generic disk drive controller driver is capable of interacting with the new drive because any unique aspects of the new drive are transparent to the generic device driver as long as the new drive's low level driver is designed to be compatible to the higher level generic disk drive controller driver. Accordingly, new subsystems and components may be integrated with the VCE 100 without requiring high level VCE changes as long as their drivers conform to the VEEDIMS standard interface protocol.

The VModule 118 may have a unique identifier that can be used within the VCE 100 to distinguish it from other VModules. The unique identifier may be a media access control (MAC) address, IP address, or any other unique identifying code (e.g., a serial number).

As will be described below in greater detail, the VModule 118 may maintain its own fully encrypted password protected internal website stored in non-volatile memory (e.g., the memory 602). The information may include product documentation and revision levels, a complete bill of materials (BOM), and repair and manufacturing history. The VModule 118 may broadcast or send this data to peer VModules and higher level component (e.g., VSwitches 116 and VController 112) in the VCE 100. The VModule 118 may maintain a cached data snapshot of events prior to a failure in non-volatile memory for fault analysis, and may also store run hours and other parameters of interest. Using such information, replacement of a failed VModule 118 may be accomplished without the need to reconfigure the VCE's software. The VModule 118 may be configured to execute a diagnostic at startup and report its status as needed. Furthermore, VModules 118, as well as VSwitches 116 and VControllers 112, may all generate a heartbeat signal, and the VController 112 may monitor the heartbeats to determine the status of various VCE components.

Figure 7:
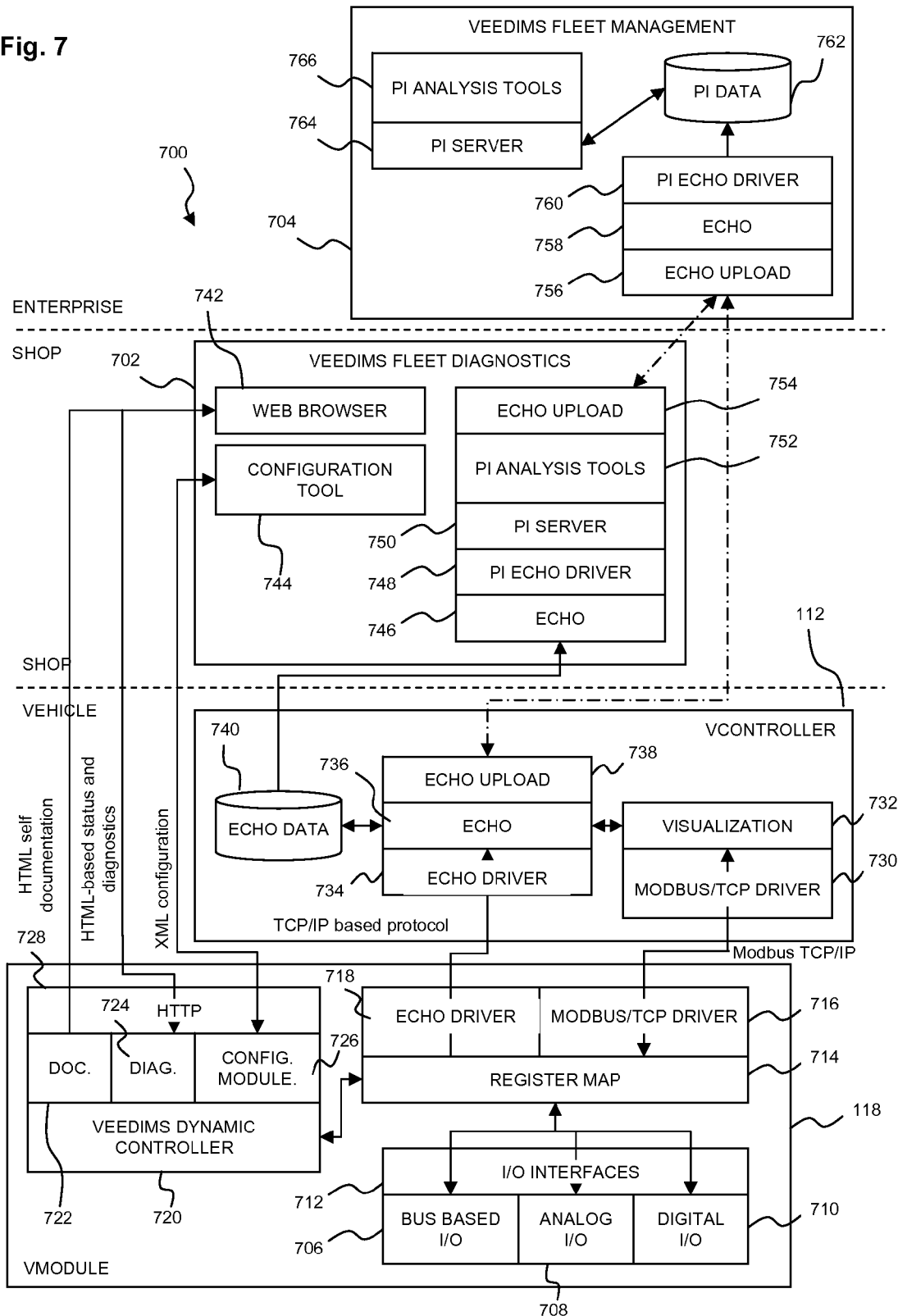
FIG. 7 illustrates one embodiment of a system architecture that may incorporate aspects of the VCE of FIG. 1.

Referring to FIG. 7, one embodiment of a system architecture 700 is illustrated. The system architecture 700 views the VCE 100 as having an information top layer that is widely accessible and may be manipulated, a middle control layer that is mission critical, and a device layer. The system architecture 700 focuses on the information top layer and uses the underlying layers mainly for data acquisition and diagnostics. For purposes of example, the system architecture 700 is described with respect to a vehicle layer, a shop (e.g., a vehicle repair garage) layer, and an enterprise layer. The VCE 100 in the present embodiment includes the VController 112 and VModule 118 of FIG. 1 in the vehicle layer, VEEDIMS fleet diagnostics 702 in the shop layer, and VEEDIMS fleet management 704 in the enterprise layer. In the present example, the PI System provided by OSIsoft, Inc., of San Leandro, Calif., is used for data acquisition, compilation, and analysis. However, it is understood that other systems may be used and the present disclosure is not limited to the PI system.

In the present embodiment, the VCE 100 of FIG. 1 is configured to support serial data storage, which enables time and excursion based fault analysis after an event (e.g., a failure) occurs. Traditional automotive diagnostic systems are based on an error code paradigm. In the error code paradigm, a specific fault generates a pre-defined error code stored in a computer, theoretically allowing a service technician to diagnose the root cause of the fault and repair the system. Unfortunately, this pre-defined error code approach cannot capture an unforeseen fault event or a sequence of events, which often results in extended troubleshooting sessions that may never identify the root cause of the original problem. For example, if the error cannot be isolated, large sections of wiring harness or even larger part assemblies may be replaced in an attempt to eliminate the fault generating component. Such a trial and error approach to problem solving is extremely costly to the customer, the dealer, and the manufacturer.

The present disclosure addresses this issue by providing the system architecture 700 to support the high resolution capture of all time series and event driven data and its storage in compact non-volatile digital media. The system also allows the data to be reviewed and analyzed to view the status of various systems during the interval of a specific fault. This capability enables the correlation of system data to a specific fault event noticed by the customer or recorded by the VCE 100, and also enables pre-event data streams to be analyzed in order to develop a comprehensive picture of what may have led up to the failure. This analysis process enables a service technician to use computerized tools to rapidly and efficiently diagnose the cause of intermittent faults, which are traditionally the most difficult fault event to detect and repair.

The VCE 100 may also provide the ability to store all of the collected data that is generated. By allowing filtering only for compression and exceptions, storage efficiency may be increased without losing resolution. Furthermore, by using transmission technologies (e.g., Bluetooth and other wireline and wireless technologies), the accumulated data can be downloaded for later analysis directed to identifying improvements rather than simply addressing current issues. For example, the data may be analyzed to identify fault conditions that can be used to define predictive means for preventing future component failures.

The data may be organized for fast retrieval and advanced searches, such as searches for logical expressions or excursion outside limits. In some embodiments, the data storage (e.g., a database) may use a batch sub-system that stores pointers to the beginning and end of specific parts of the data streams, thereby allowing for comparisons between similar events using overlay. For example, all engine start events may be organized by the batch sub-system so the start events can be recalled quickly and compared in order to develop a model of an optimal engine start and to predict the need for maintenance as parameters drift (e.g., cranking time on cold start). The efficiency of the database allows for sophisticated analysis, including multivariate statistical analysis. This may enable real-time data analysis that can not only perform fault detection, but can also execute preventive maintenance functions by observing trends that move away from normal operational parameters. In some examples, the VCE 100 may be configured for control based on a golden profile (e.g., an optimal set of performance parameters) and to trigger an alarm when the performance drifts away from the profile.

To achieve this level of analysis, the VModule 118 gathers information regarding attached subsystems/devices 200 (FIG. 2) using sensors and other feedback mechanisms. The information may be obtained via interfaces such as a bus-based I/O interface 706, an analog I/O interface 708, and a digital I/O interface 710. Each of the I/O interfaces 706, 708, and 710 passes information through a generic I/O interface layer 712 that allows the VModule 118 to communicate in a uniform manner with each of the different types of I/O interfaces.

The I/O interface layer 712 stores the information in a register map 714, which is accessible to a Modbus/TCP driver 716 and an Embedded Component Historian Object (ECHO) driver 718 (e.g., ECHO as supported by the PI System provided by OSIsoft, Inc., of San Leandro, Calif.). The Modbus/TCP driver 716 and ECHO driver 718 interface with corresponding components of the VController 112 as will be described later.

The register map 714 is also accessible to a VEEDIMS dynamic controller 720 that is configured to obtain information from the register map, process the information, and update and maintain documentation 722. Documentation version control may be a complex problem in vehicles with high degrees of sophistication or having a large manufacturing volume. To solve this problem, VEEDIMS embeds the entire documentation set within the VModule 118 or in another sub-system, making it instantly available to a service technician. In addition, a service log may be stored that can be updated to accurately reflect the service history of the vehicle. In some embodiments, the service log may be linked to a billing system that will automatically update the log.

The dynamic controller 720 may also perform diagnostics and maintain information resulting from the diagnostics using a diagnostics module 724, and may configure VModule and subsystem/device parameters and maintain configuration information using a configuration module 726. The dynamic controller 720 may make the documentation 722 and information related to the diagnostics module 724 and configuration module 726 available via a HyperText Transfer Protocol (HTTP) interface 728 using the previously described embedded web server. In the present example, the information is made available to the VEEDIMS fleet diagnostics 702 in the shop layer, but it may be made available to many other users, including an operator of the vehicle corresponding to the VCE 100.

The VController 112 includes a Modbus/TCP driver 730 that receives information from the register map 714 via the Modbus/TCP driver 716 of the VModule 118. The Modbus/TCP driver 730 passes the information into a visualization module 732 that may process the information before passing the processed information to an ECHO component 736. The VController 112 also includes an ECHO driver 734 that receives information from the register map 714 via the ECHO driver 718 of the VModule 118. The ECHO driver 734 passes the information to the ECHO component 736. The ECHO component 736 may send some or all of the information to VEEDIMS fleet management 704 in the enterprise layer via an ECHO upload component 738. The ECHO component 736 may also store all or some of the information in an ECHO data database 740, which may be responsible for gathering and archiving large amounts of time-stamped data at high speeds (e.g., real time or near real time).

Some or all of the data stored by the VController 112 and VModule 118 may be stored in a "black box" designed to withstand high impact and high temperature situations, such as an accident. The data described above may then be available for analysis even if various subsystems are damaged or destroyed.

VEEDIMS fleet diagnostics 702 in the shop layer includes a web browser 742 that may be used to access and view documentation data 722 and diagnostics data 724 via the HTTP interface 728 provided by the web server of the VModule 118. Due to the HTTP nature of the data presented by the VModule 118, access to the data can be accomplished without the need for proprietary equipment and tools. As the data may be encrypted, security may be maintained as only users with the proper authorization credentials can access the data. The VEEDIMS fleet diagnostics 702 may also include a configuration tool 744 that may be used to interact with the configuration module 726 to obtain configuration information and to configure parameters of the VModule 118, other VModules, and attached subsystems/devices using eXtensible Markup Language (XML) configuration information.

VEEDIMS fleet diagnostics 702 further includes an ECHO component 746 that obtains data from the ECHO data database 740 of the VController 112. The data may be passed to a PI server 750 via a PI ECHO driver 748 and various PI analysis tools 752 may be used to analyze some or all of the data in the shop layer. The data may be passed to VEEDIMS fleet management 704 in the enterprise layer via an ECHO upload component 754.

VEEDIMS fleet management 704 in the enterprise layer includes an ECHO upload component 756 that receives data from the ECHO upload components 738 and 754. The ECHO upload component 756 passes the data to an ECHO component 758, which stores the data in a PI data database 762 via a PI ECHO driver 760. PI analysis tools 766 may access the data in the PI data database 762 for analysis via a PI server 764.

Figure 8:
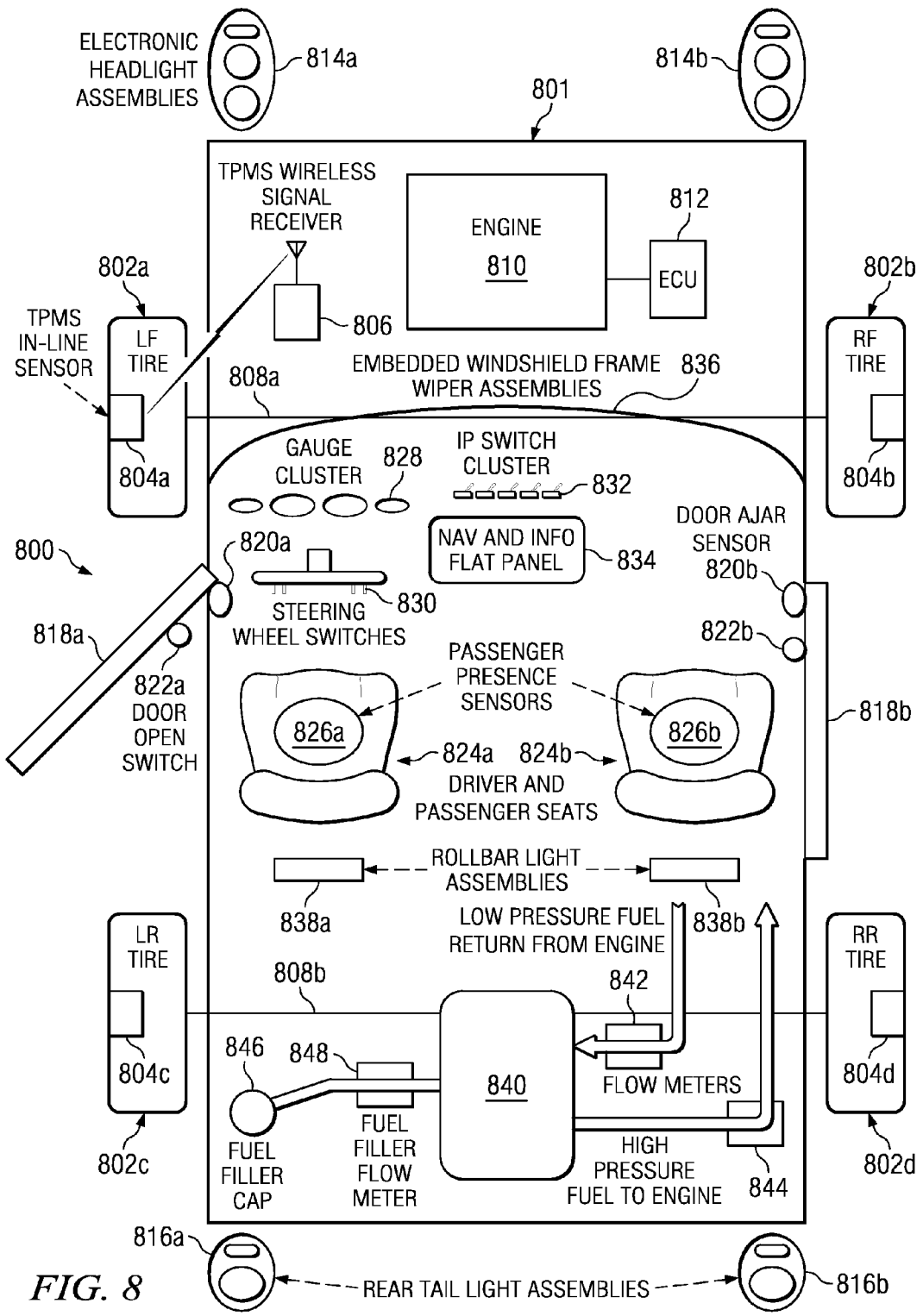
FIG. 8 illustrates one embodiment of a vehicle in which the VCE of FIG. 1 may be used.

Referring to FIG. 8, in one embodiment, a vehicle 800 is illustrated as an environment that may be managed using the VCE 100 of FIG. 1. The vehicle 800 includes a chassis 801 and positioned within or coupled to the chassis are a plurality of subsystems and corresponding components that provide propulsion, steering, braking, and other functionality to the vehicle 800. It is understood that the subsystems and components described herein are for purposes of example only, and that many other subsystems and components may be used with the vehicle 800. Furthermore, illustrated subsystems and components may be configured differently from those illustrated and may be positioned in differently within the vehicle 800.

The vehicle 800 includes tires 802a, 802b, 802c, and 802d and corresponding tire pressure monitoring system (TPMS) in-tire sensors 804a, 804b, 804c, and 804d, respectively, which send signals to a TPMS wireless signal receiver 806. The tires 802a, 802b, 802c, and 802d are coupled to axles 808a and 808b that are powered via a transmission system (not shown) coupled to an engine 810. An Engine Control Unit (ECU) 812 may monitor and manage the performance of the engine 810. For example, the ECU 812 may control fuel injection in the engine 810 based on monitored parameters. Headlight assemblies 814a and 814b and tail light assemblies 816a and 816b may be coupled to an electrical system that enables manipulation of various lights forming the headlight and tail light assemblies.

Doors 818a and 818b may be monitored using "door ajar" sensors 820a and 820b, respectively. "Door open" switches 822a and 822b may be used to control interior lights, alarms, and other functions when doors 818a and 818b, respectively, are opened. Driver seat 824a and passenger seat 824b may include presence sensors 826a and 826b, respectively, which indicate the presence of a person.

The passenger compartment may also contain a gauge cluster 828 for providing feedback information to the driver (e.g., speed, fuel level, and engine temperature), various actuation means (e.g., switches and buttons) positioned on a steering wheel 830, an instrument panel switch cluster 832, and an interactive navigation and information screen 834 (e.g., a flat panel). The interactive screen 834 may be used to provide navigation information, vehicle information (e.g., a current fuel level, estimated remaining mileage before fuel is needed, and various temperatures (e.g., engine and passenger compartment temperatures)), and other information to a user. Windshield wiper assemblies 836 may be controlled via the actuation means on the steering wheel 830. Rollbar light assemblies 838a and 838b may be coupled to an electrical system that enables manipulation of various lights on the rollbar light assemblies via, for example, the interactive screen 834.

A fuel cell 840 may be coupled to a flow meter 842 that measures fluid flow on a low pressure fuel return from the engine 810 and a flow meter 844 that measures fluid flow on a high pressure fuel line to the engine. A fuel cap 846 may cover a fuel fill line that is monitored by a flow meter 848. Although not shown, a sensor may monitor the fuel cap 846 to ensure that it is in place. The fuel cell 840 and the various flow meters 842, 844, and 848 may be monitored.

It is understood that the vehicle 800 may include a variety of subsystems (not all shown) configured to monitor and/or control vehicle functions such as ignition, propulsion, steering, braking, oil and tire pressure, control panel indicators, passenger compartment environmental parameters (e.g., temperature and air flow), and audio/video entertainment system settings. Such subsystems may range from complex (e.g., fuel injection as managed by the ECU 812) to relatively simple (e.g., control of an interior "dome" light).

Figure 9:
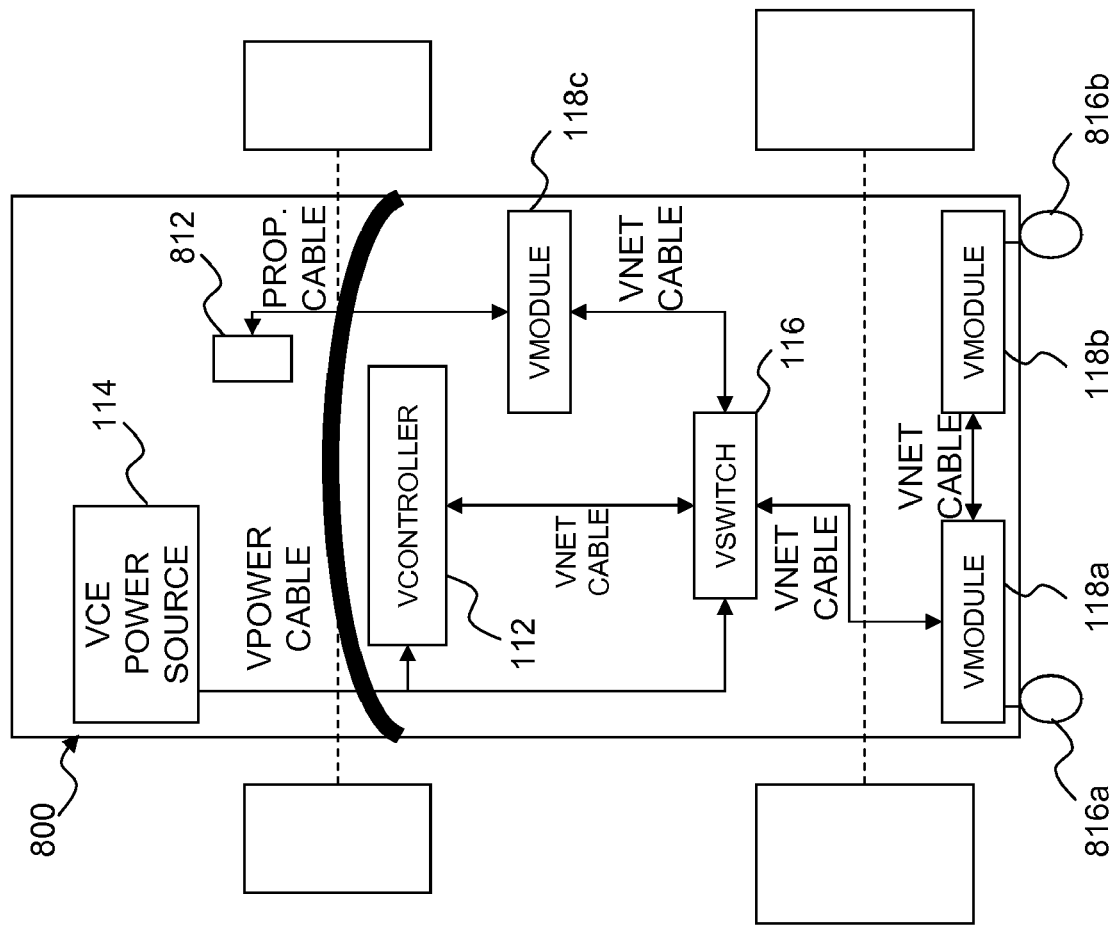
FIG. 9 illustrates one embodiment of the VCE of FIG. 1 positioned within the vehicle of FIG. 8.

With additional reference to FIG. 9, one embodiment of the VCE 100 of FIG. 1 is illustrated in the vehicle 800 of FIG. 8. The vehicle 800 includes a VController 112 and VCE power source 114 that are coupled to one another and to a VSwitch 116. The VSwitch 116 is coupled to a first VModule 118a, which is in turn coupled to a second VModule 118b. The VModules 118a and 118b are coupled to the tail light assemblies 816a and 816b, respectively. In the present example, each tail light assembly 816a and 816b includes multiple LEDs that are divided into a reverse light area, a brake light area, and a turn signal area. In some embodiments, the VModules 118a and 118b are incorporated into their respective tail light assemblies. In other embodiments, the VModules 118a and 118b are coupled to their respective tail lights but are separate components. The VController 112 is also coupled to a VModule 118c, which is in turn coupled to the ECM 812 via a proprietary cable.

In the present example, VModules in the VCE 100 are categorized into classes, including a passive switch class, a solenoid/actuator class, a motor class, a passive information display class, an interactive information display class, a passive data pass through class, a feedback data acquisition class, and a lighting control class. It is understood that these classes are for purposes of example and are not intended to be limiting. Furthermore, overlap may exist between certain classes and all or part of some classes may form a subset of another class.

The passive switch class includes subsystems and components such as simple on/off state switches or momentary contact switches that may be used for the door ajar sensors 820a and 820b or the passenger presence sensors 826a and 826b. This class may also include more complex multi-position passive switches used to control multiple functions or states, such might be used in windshield wiper controls to activate intermittent, slow, medium, and fast wiping intervals of the windshield wiper assemblies 836.

The solenoid/actuator class includes subsystems and components used for electrically opening a door, trunk lid, or any other single action or process. The motor class includes subsystems and components used in operating windshield wipers (e.g., the windshield wiper assemblies 836), hood/door opening mechanisms, movement of power seats or mirrors, and similar motorized operations.

The passive information display class includes subsystems and components that deliver visual display information for a user, including electric/electronic dashboard gauges in the gauge cluster 828, active displays such as addressable matrix liquid crystal displays (LCDs), and organic light emitting diode (OLED) displays. The interactive information display class includes subsystems and components such as the interactive screen 834, global positioning system (GPS) navigation devices, sound systems, active displays, and interactive starter switches that provide engine standby/start/stop control switching capabilities with a status display.

The passive data pass through class includes subsystems and components for performing data acquisition and pass-through, including passive displays. The feedback data acquisition class includes subsystems and components such as interactive displays, lighting control modules, and engine control modules. The lighting control class includes subsystems and components for the headlight assemblies 814a and 814b, daytime running lights, tail light assemblies 816a and 816b, and general interior and instrument panel lighting.

According to the preceding class list, VModules 118a and 118b of the present example are categorized as lighting control class modules. The VModule 118c may be categorized in the passive data pass or the feedback data acquisition class.

The VModule 118c is an example of a VModule that may interact with a legacy non-VEEDIMS enabled subsystem or component to provide at least a basic level of VEEDIMS functionality to the legacy non-VEEDIMS enabled subsystem or component. The VModule 118c receives CAN-bus data from the ECM 812 via a proprietary cable. The VModule 118c then converts the CAN-bus data into VNet data and sends the converted data over the VNet backbone. This makes the CAN-bus data available to the VCE 100 without the need to perform other conversions at VCE levels higher than the VModule 118c. In some embodiments, a VEEDIMS enabled ECM may be used in place of the ECM 812, thereby allowing the ECM to be integrated seamlessly into the VCE 100. A VEEDIMS enabled ECM may include the ability to cache engine start and run data until higher level control systems are ready to receive it. The caching technique may accommodate any latency, provide synchronization of time stamping, and allow higher level systems to be shut down for upgrading or maintenance without any data loss.

For purposes of example, the VModules 118a and 118b each include a circuit board having a Netburner that executes instructions so that each of the VModules forms a MAXI board as previously described. Each VModule 118a and 118b includes multiple power supplies needed to run the reverse lights of the reverse light area of the tail light assemblies 816a and 816b, and may include other power supplies to run the brake light and turn signal areas.

The VModules 118a and 118b can individually address the LEDs of each of the tail light assemblies 816a and 816b and may use fiber optic links or other means to receive feedback from the LEDs to identify brightness levels, etc. For example, when the vehicle 800 is started, the VModules 118a and 118b may perform a rapid test of each LED in the tail light assemblies 816a and 816b to ensure that the LEDs are working. This may be achieved using feedback obtained via a fiber optic link, thereby allowing the VModules 118a and 118b to measure a brightness level and color of each LED or of groups of LEDs. The color test may be accurate to a resolution of eighteen bits, which gives the VModules 118a and 118b a high degree of control over the light output of the tail light assemblies 816a and 816b. Using this information, the VModules 118a and 118b can control the output of the LEDs using, for example, a pulse width modulation (PWM) collective drive.

The feedback provided to the VModules 118a and 118b may be used for a variety of purposes other than testing. For example, the feedback may be used to control day and night lighting such as daytime running lights and may be used to adjust the intensity of the LEDs based on the ambient light level. In another example, the feedback may be used to provide active reflectors using the tail light assemblies 816a and 816b. To form active reflectors, the LEDs may remain off until the optic fibers detect light coming from an exterior source. One possible scenario in which this may occur is if the vehicle 800 has malfunctioned and is on the side of the road at night. Rather than leaving the hazard lights blinking and draining the battery, the fiber optics may detect headlights from other vehicles and, in response, may activate some or all of the LEDs to provide an active indication of the vehicle's presence. The LEDs may be flashed or otherwise manipulated to provide additional indicators.

The MAXI boards forming the VModules 118a and 118b may include one or more general purposes serial interfaces for purposes such as lighting control. For example, the MAXI boards may support DMX (used for lighting control by the entertainment industry) over Ethernet and other specialized digital control protocols. Other serial interfaces may be supported by the MAXI boards, including an RS232 compliant serial port.

In the present example, the tail light assemblies 816a and 816b each include a power supply (PS) board (not shown) positioned between the VCE power source 114 and the LEDs. The PS board may not be VEEDIMS enabled, but may be coupled to the VModules 118a and 118b via a unidirectional signal or a bidirectional signal. The PS boards are capable of setting a maximum current to the LEDs and the maximum current may be controlled by the corresponding VModules 118a and 118b via an addressable potentiometer positioned on the PS boards. The PS boards may also send PWM signals to the LEDs to control intensity and the PWM signals may be controlled by the VModules 118a and 118b. It is noted that some or all of the functions of the PS boards may be controlled locally so that the tail light assemblies 816a and 816b are able to operate without the VModules 118a and 118b.

Figure 10:
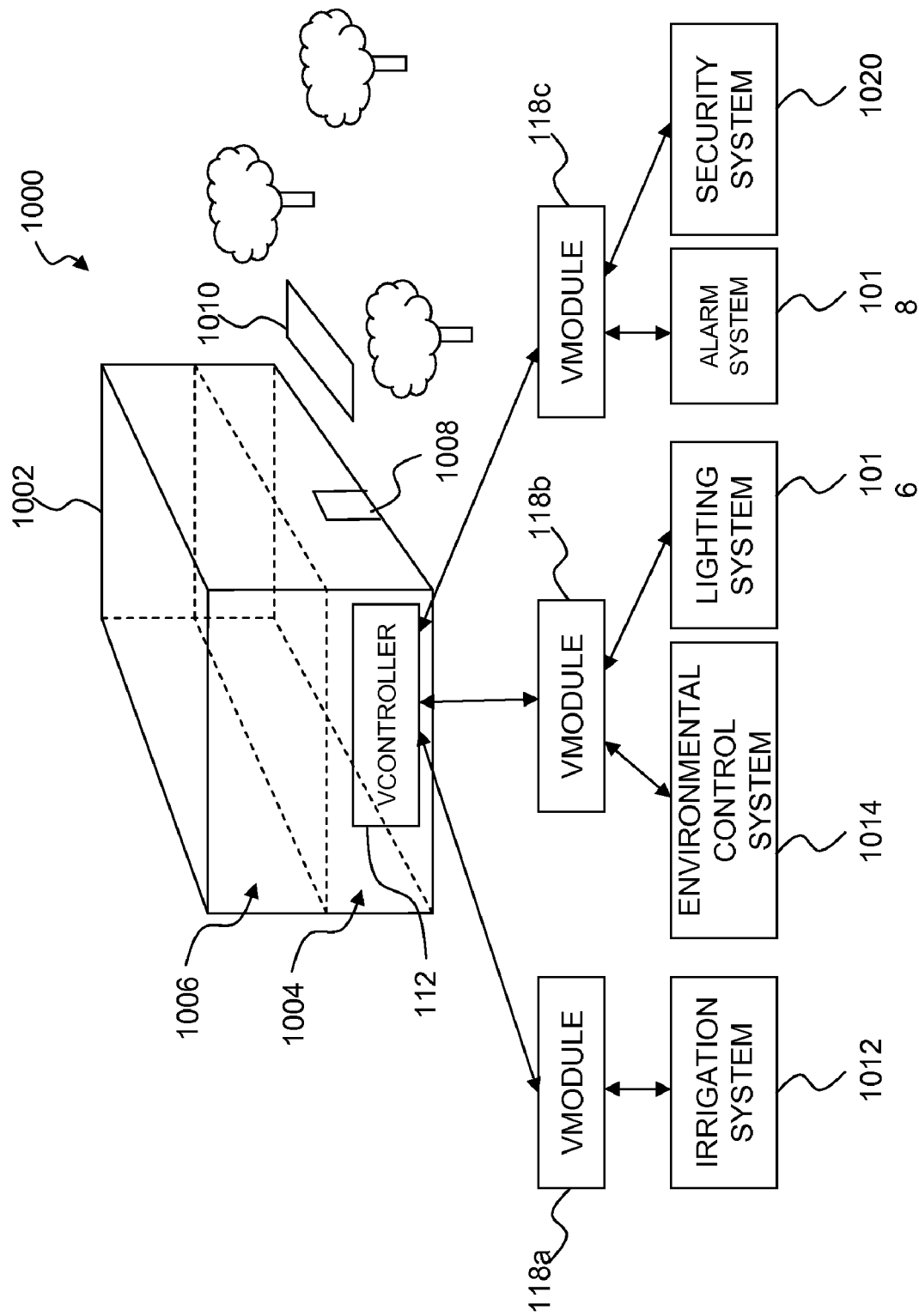
FIG. 10 illustrates one embodiment of a structure in which the VCE of FIG. 1 may be used.

Referring to FIG. 10, in another embodiment, an environment 1000 illustrates a structure 1002 that contains the VCE 100 of FIG. 1. In the present example, the structure 1002 is an above ground building that includes multiple floors 1004 and 1006 and one or more entry ways 1008 (e.g., a door). Landscaping, such as a flowerbed 1010, may be positioned around the structure 1002. The structure 1002 may be associated with multiple components and corresponding systems for monitoring and controlling the components. For example, the structure 1002 may be associated with an irrigation system 1012, an environmental control system 1014, a lighting system 1016, an alarm system 1018, and a security system 1020. It is understood that each of the systems 1012, 1014, 1016, 1018, and 1020 may represent multiple systems or subsystems.

The irrigation system 1012 may be configured to control and monitor the provision of moisture to the flowerbed 1010 and other exterior landscaping and interior plant arrangements (not shown). The environmental control system 1014 may be configured to control and monitor heating and air conditioning facilities. The lighting system 1016 may be configured to control and monitor interior and exterior lighting of the structure 1002, and may represent an interior lighting system and an exterior lighting system. The alarm system 1018 may represent a fire alarm system and a security alarm system. The alarm system 1018 may be configured to control and monitor safety components (e.g., fire alarms) within the structure 1002, as well as security alarms (e.g., a burglar alarm on the door 1008 to indicate unauthorized entry or an alarm on an interior door to control access to a room or office suite). The security system 1020 may be configured to control and monitor cameras, motion sensors, and similar security devices, and may also control and monitor security alarms in some embodiments.

One or more VControllers 112 may be used to monitor and control the systems 1012, 1014, 1016, 1018, and 1020 via a VNet backbone that may or may not include power transfer capabilities. The VController 112 is coupled to multiple VModules 118a, 118b, and 118c. Although not shown, one or more VSwitches 116 may be positioned between the VController 112 and the VModules 118a, 118b, and 118c.

The VModule 118a is coupled to the irrigation system 1012. The VModule 118b is coupled to the environmental control system 1014 and lighting system 1016. The VModule 118c is coupled to the alarm system 1018 and security system 1020. Each VModule 118a, 118b, and 118c may monitor, query, and control the coupled systems 1012, 1014, 1016, 1018, and 1020 as described above in previous embodiments.

In some embodiments, the VCE 100 may be tied to deeper systems, such as the main electric grid of the structure 1002. In these cases, data obtained by the VCE 100 may be shared with other sources. For example, power grid data may be shared with the power company, which may in turn aggregate the information with other data for analysis. The analysis may be used to prevent problems including brownouts and blackouts and to track demand in a given area.

It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A Virtual Electrical and Electronic Device Interface and Management System (VEEDIMS) for a vehicle comprising:
    a backbone network formed by a plurality of cables, wherein each cable is configured to simultaneously carry digital data and power;
    a controller coupled to the backbone network and configured to execute a plurality of control instructions;
    a plurality of modules coupled to the controller via the backbone network and configured to receive data and all power needed by the modules via the backbone network, wherein the modules are configured to receive control signals from the controller based on the plurality of control instructions; and
    at least one device coupled to a first module of the plurality of modules via a direct input/output (I/O) interface positioned in the first module, wherein a device specific driver contained in the first module provides a communications interface between the device and a generic VEEDIMS controller driver in the controller, wherein the first module is configured to determine if the device is specifically configured for communication with the first module and, if the device is not specifically so configured and unable to communicate with the first module, the first module is configured to monitor a behavior pattern of the device to create a profile of the device for use by the controller, and if the device is specifically so configured the first module is configured to obtain the profile of the device directly from the device by communicating with the device, and wherein the profile is used to prevent short circuits and other problems of the device.

2. The VEEDIMS of claim 1 further comprising a switch positioned in the backbone network between the controller and the first module, wherein the switch is configured to pass the needed power from a power source to the first module and to transfer communications between the first module and the controller.

3. The VEEDIMS of claim 2 wherein the backbone network is Ethernet based and wherein the controller and first module each include a transmission control protocol (TCP) driver for communications between the first module and the controller.

4. The VEEDIMS of claim 2 wherein the switch includes an Ethernet switch.

5. The VEEDIMS of claim 1 wherein the first module further comprises a HyperText Transfer Protocol (HTTP) server.

6. The VEEDIMS of claim 5 wherein the first module further comprises a diagnostics component configured to obtain diagnostics data about the first module and the device and to make the diagnostics data accessible via the HTTP server.

7. The VEEDIMS of claim 5 wherein the first module further includes a documentation set containing a service history of the first module, and wherein the documentation set is configured to be accessible via the HTTP server.

8. The VEEDIMS of claim 1 wherein the first module further comprises a configuration component configured to set operational parameters for at least one of the first module and the device.

9. The VEEDIMS of claim 1 wherein the first module further comprises a data acquisition component configured to acquire data about at least one of the first module and the device.

10. The VEEDIMS of claim 9 wherein the data acquisition component includes an Embedded Component Historian Object (ECHO) coupled to an ECHO driver for sending the acquired data from the first module to the controller.

11. The VEEDIMS of claim 9 wherein the acquired data is stored in a register map in the first module prior to being transferred to a database in the controller.

12. The VEEDIMS of claim 1 wherein the first module is integrated with the device.

13. The VEEDIMS of claim 1 wherein the first module is further configured to run at least one test on the device to determine a level of power used by the device.

14. The VEEDIMS of claim 1 wherein the first module is configured to allocate a defined level of power to the device prior to monitoring the behavior pattern of the device, wherein the first module is configured to allocate the power only if allowed by the controller.

15. A Virtual Electrical and Electronic Device Interface and Management System (VEEDIMS) for a vehicle comprising:
- a first controller having a first power interface configured to receive a first connector of a first cable configured to carry only power, a first network/power interface configured to receive a first single cable connector of a third cable adapted configured to simultaneously carry both power and data, a first processor coupled to the first power and first network/power interfaces, and a first memory containing a plurality of instructions executable by the first processor, the instructions including controller instructions configured to control a plurality of modules;
- a battery coupled directly to the first power interface via a second connector of the first cable configured to carry only power;
- a first switch having a second power interface configured to receive a first connector of a second cable configured to carry only power and coupled directly to the battery via the second cable, and a second network/power interface configured to receive a second single cable connector of the third cable and configured to receive a first single cable connector of a fourth cable configured to simultaneously carry both power and data, wherein the first switch is coupled directly to the first network/power interface via the third cable configured to simultaneously carry both power and data, and wherein the first switch is configured to act as a data conduit between the first controller and the plurality of modules and as a power conduit between the battery and the plurality of modules;
- a first module of the plurality of modules having a third network/power interface configured to receive a second single cable connector of the fourth cable and coupled directly to the second network/power interface via the fourth cable configured to simultaneously carry both power and data, a device input/output (I/O) port, a second processor coupled to the third network/power interface and the device I/O port, and a second memory containing a plurality of instructions executable by the second processor, the instructions including driver instructions configured to enable communications between the first module and a device coupled to the first module via the device I/O port, wherein the first module is configured to provide a communication interface between the device and the first controller via the switch.

16. The VEEDIMS of claim 15 further comprising a second controller coupled to the first controller via a fifth cable configured to simultaneously carry both power and data, wherein the first memory contains a plurality of instructions executable by the first processor for balancing a load caused by the plurality of modules between the first and second controllers.

17. The VEEDIMS of claim 15 further comprising a second switch having a third power interface and a fourth network/power interface coupled directly to the second network/power interface via a fifth cable configured to simultaneously carry both power and data, wherein the second switch is configured to obtain its power from the first switch rather than the battery.

18. The VEEDIMS of claim 17 wherein the first and second switches are configured to pass power from the first switch to the second switch via the fifth cable and to simultaneously pass data from the second switch to the first switch via the fifth cable.

19. The VEEDIMS of claim 15 further comprising a second module having a fourth network/power interface coupled directly to the third network/power interface via a fifth cable configured to simultaneously carry both power and data, wherein the second module is configured to obtain its power from the first module.

20. The VEEDIMS of claim 15 wherein the second memory further includes instructions for sending a query to the device when the device is first coupled to the first module and sending data resulting from the query to the first controller.

21. The VEEDIMS of claim 15 wherein at least one of the first module and device includes an optical indicator configured to indicate whether the first module or device is operational after being coupled to the first switch or first module, respectively.

22. The VEEDIMS of claim 15 wherein the second memory further includes instructions for sending data describing functionality of the first module to the first controller when the first module is first coupled to the first switch.

23. The VEEDIMS of claim 15 wherein the first switch includes a third processor coupled to the second network/power interface and a third memory containing a plurality of instructions executable by the third processor, the instructions including instructions for determining a power requirement of the device when the device is first coupled to the first module and for determining whether enough power is available to the first switch to meet the power requirement of the device.

24. The VEEDIMS of claim 15 wherein the first module and the device are integrated into a single unit.

25. The VEEDIMS of claim 15 wherein a plurality of devices are coupled to the first module.

* * * * *